(12) United States Patent
Buntain

(10) Patent No.: US 10,871,386 B1
(45) Date of Patent: Dec. 22, 2020

(54) SENSOR MOUNT

(71) Applicant: Mark Buntain, Pittsburgh, PA (US)

(72) Inventor: Mark Buntain, Pittsburgh, PA (US)

(*) Notice: Subject to any disclaimer, the term of this patent is extended or adjusted under 35 U.S.C. 154(b) by 133 days.

(21) Appl. No.: 16/014,061

(22) Filed: Jun. 21, 2018

Related U.S. Application Data

(60) Provisional application No. 62/522,742, filed on Jun. 21, 2017.

(51) Int. Cl.
| | | |
|---|---|---|
| *G01D 11/24* | (2006.01) | |
| *G01B 5/00* | (2006.01) | |
| *G06K 7/10* | (2006.01) | |

(52) U.S. Cl.
CPC ......... *G01D 11/245* (2013.01); *G01B 5/0004* (2013.01); *G06K 7/10792* (2013.01); *G06K 7/10722* (2013.01)

(58) Field of Classification Search
CPC ............... G01D 11/245; G01B 5/0004; G06K 7/10792; G06K 7/10722
See application file for complete search history.

(56) References Cited

U.S. PATENT DOCUMENTS

| | | | | |
|---|---|---|---|---|
| 7,460,316 B2* | 12/2008 | Kleewein | ................ | B66B 23/22 359/811 |
| 2004/0149797 A1* | 8/2004 | Urleb | ........................ | A45F 5/02 224/668 |
| 2005/0040812 A1* | 2/2005 | Holt | ................... | G01R 31/2887 324/756.01 |
| 2009/0052037 A1* | 2/2009 | Wernersson | ....... | H04N 5/23248 359/554 |
| 2013/0344613 A1* | 12/2013 | Li | ........................ | G01N 21/645 436/172 |
| 2014/0191109 A1* | 7/2014 | Chamberlin | ......... | G01N 35/028 250/201.7 |
| 2016/0259329 A1* | 9/2016 | High | .................... | A47L 11/4011 |
| 2019/0011251 A1* | 1/2019 | Moeller | ............... | G01N 21/255 |

* cited by examiner

*Primary Examiner* — Suman K Nath

(57) ABSTRACT

The present invention pertains to the art of sensing articles typically moving on a conveyor. An apparatus is disclosed, for the purpose of securely attaching a sensing device to a sub-structure such as a sidepan metal sheet that contains a hole through which the sensing/detection device passes its sensing beam. A primary novelty of the apparatus is that it enables secure mounting of various 'through-hole' devices without the need for attaching any additional bracketry and without creating obstructions to package movement. It is unique in that it utilizes the "through-hole" which is necessary to allow passage of the sensing beam through the side guards of the conveyor, with the below-surface attachment being made possible by means of a tapered, or 'sloping' surface that is created when the hole is made.

12 Claims, 5 Drawing Sheets

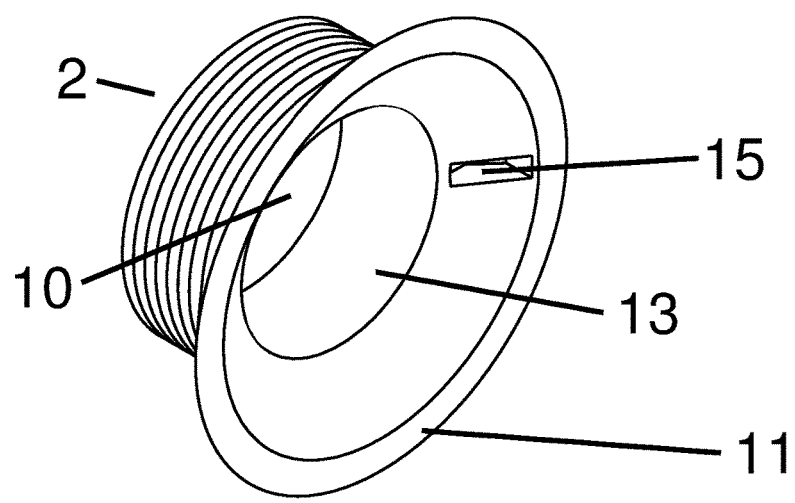
Fig. 3
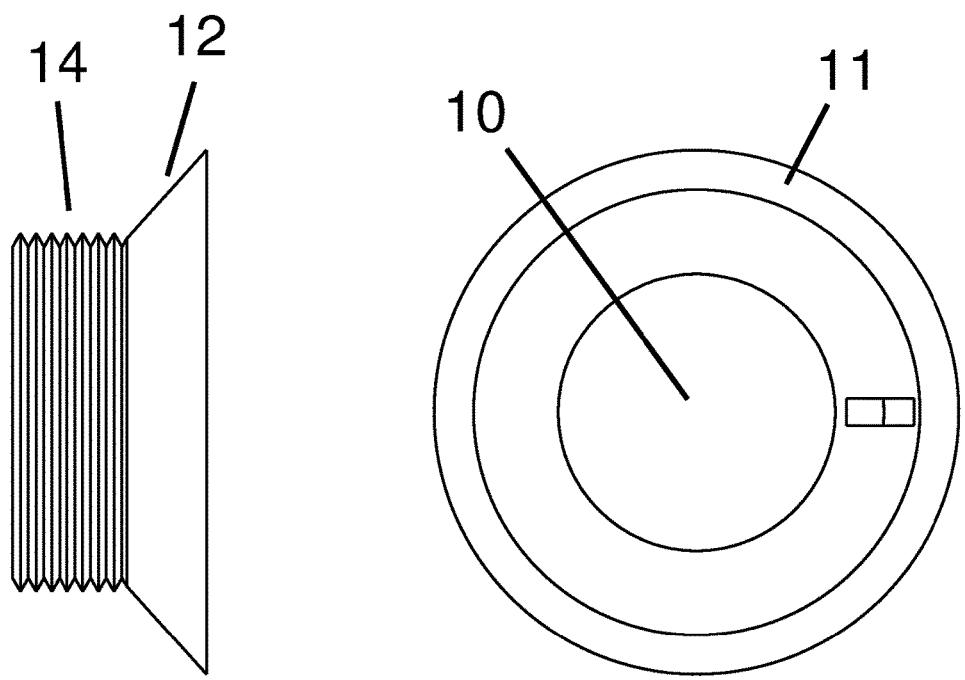
Fig. 4
Fig. 5

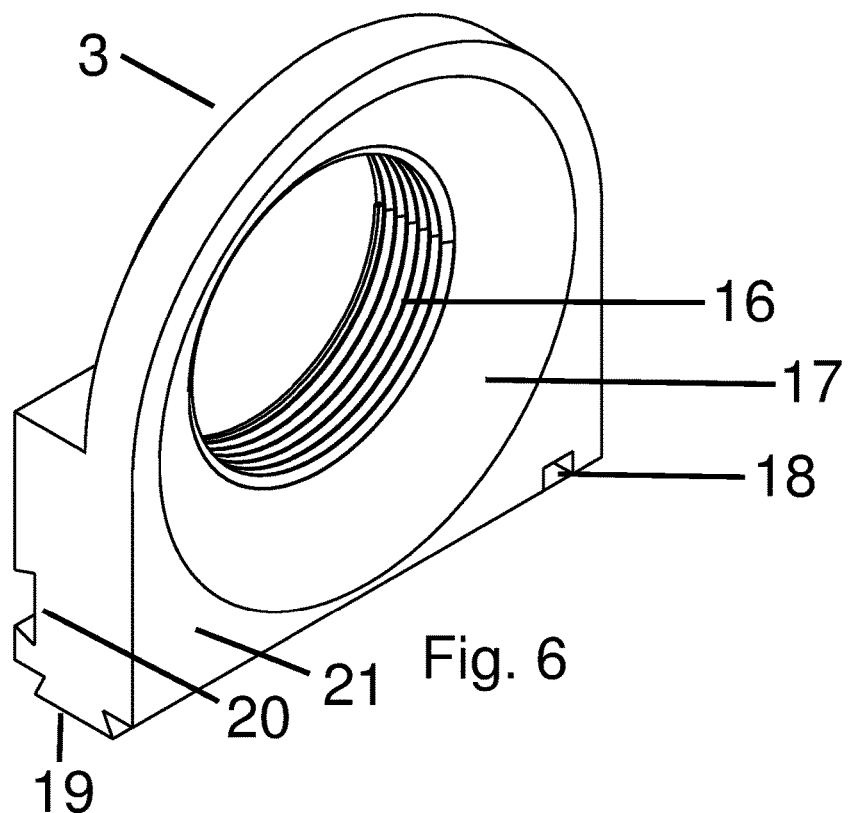
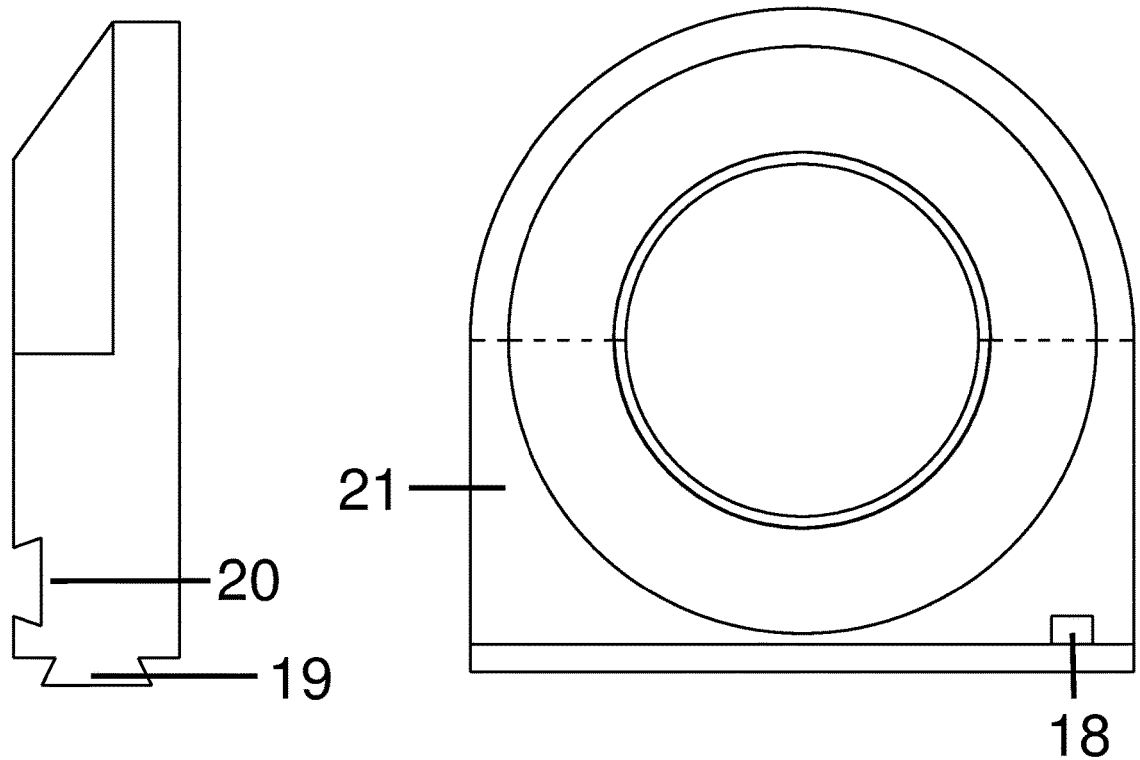

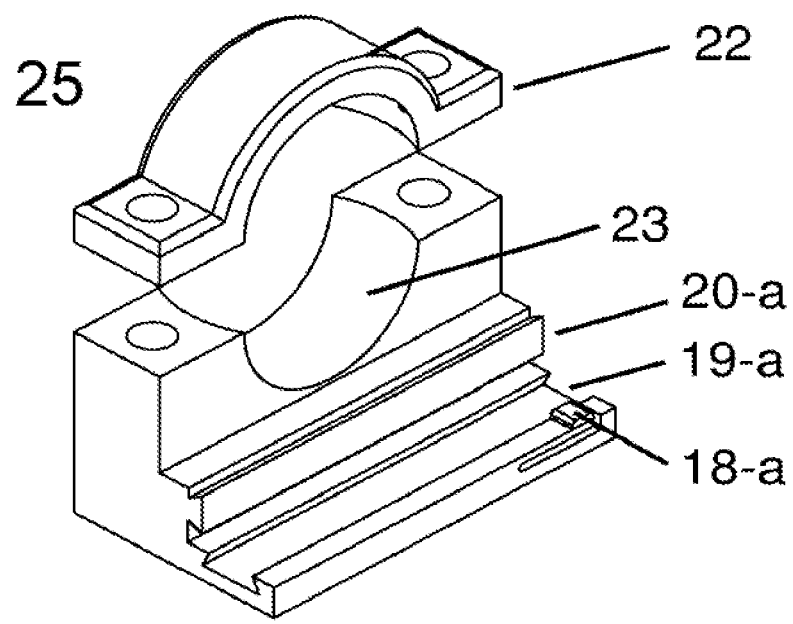
Fig. 9
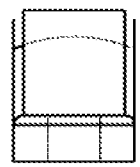
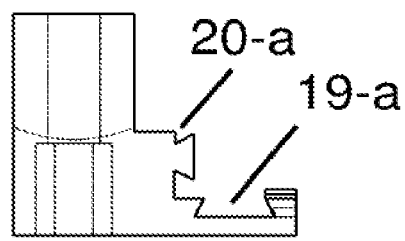
Fig. 10
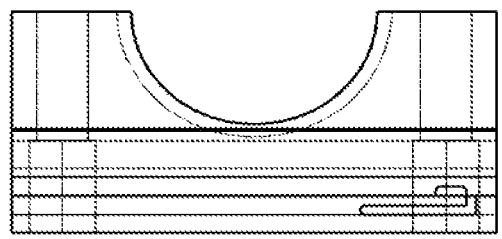
Fig. 11

SENSOR MOUNT

BACKGROUND OF THE INVENTION

Sensor mounts are typically designed to be universal with little consideration for any unique needs or constraints of specific applications or industries. This is particularly the case for package transport conveyors, as they require obstruction-free paths, so that packages do not get restrained by anything protruding into the package path, which can create a jammed condition preventing free flow of packages.

The current standard practice is to expend considerable time and extra cost to acquire, cut and prepare the components to attach brackets and devices that allow the sensors to be located in the proper orientation and function properly. These are typically metal components that need to be cut from longer standard lengths of a "Uni-Strut-type" member, deburred of sharp edges, welded to the side of the conveyor, de-slagged to remove welding residue, surface prepped to provide a good painting surface for primer and additional top coats of finished paint.

The prior art includes a few examples of somewhat-related devices. For example, U.S. Pat. No. 7,460,316 teaches a lighting device integrated into a wall of an escalator. However, escalators generally provide a standoff enforcing a minimum distance between wall and riders. Thus this type of design fails to anticipate the impacts and rigors imposed by long distances, speed, routing and other hardships of conveyor systems.

The conveyor system typically consists of a conveyance mechanism moving or propelling packages along its axial path that also has side barriers of material that are nominally perpendicular to the plane of movement to contain the package within the movement plane. The presence of a package is detected by sensing devices that utilize a laser or narrow beam of polarized light that passes perpendicular to the package path that runs axial to the conveyor. When the light path is interrupted, it signifies the presence of a package. The vertical sides that contain the package need to be smooth and obstruction-free. Hence the device must be designed such that it provides structural support for the attached sensors without creating any obstruction for the packages to catch on. There is a need to reduce the considerable time and cost to acquire, cut and prepare the components to attach brackets and devices that allow the sensors to function properly without obstruction.

SUMMARY OF THE INVENTION

The present invention pertains to the art of sensing articles typically moving on a conveyor. Thus the present invention addresses the deficiencies of the prior art by providing an apparatus for the purpose of conveniently and securely attaching a sensing device (which performs the actual sensing/detection/tracking function) to a typical conveyor substructure 1 such as metal sheet. A hole through which a sensing/detection device 5 passes its sensing beam is artfully furnished by the invention.

The present invention provides a device that fits into tapered mounting surface that is created by deformation of the sidepan substrate surface into a desired conical surface. The prior art, as in the above-cited example, typically uses a machined tapered surface or the like, requiring the removal of substrate material by a metal-cutting/removal process.

A critical aspect of the novelty of the invention herein disclosed is to enable secure mounting of various 'through-hole' devices without the need for attaching any additional bracketry and without creating obstructions to package movement. It is unique in that it utilizes the "through-hole" which is necessary to allow passage of the sensing beam through the side guards of the conveyor 1, with the below-surface attachment being made possible by means of a 'tapered', or sloping, surface that is created when the hole is made. The words 'tapered' and 'sloping' are used interchangeably in this document. The intended meaning is best understood by considering the figures and accompanying detailed description, below.

It is an object of the invention to provide an economical accommodation to a multitude of devices which Is easy to install, easy to adjust and does not require painting or subsequent surface cleaning or treatment, can be manufactured of different materials, can be manufactured in different colors of material and can be designed with multiple surfaces for unique orientations.

It is an object to provide a tracking system which minimizes wear or damage to either system or packages, such as employing very flush elements.

It is an object to provide a tracking system which may be manufactured easily and economically, such as through the use of a 3D printer.

BRIEF DESCRIPTION OF DRAWINGS

FIG. 3 shows a view of a fitting 4 that nests inside the tapered side barrier hole and connects to the basic receiver in FIGS. 6, 7, 8.

FIG. 4 shows a second view of a fitting that nests inside the tapered side barrier hole and connects to the basic receiver in FIGS. 6, 7, 8.

FIG. 5 shows a third view of a fitting that nests inside the tapered side barrier hole and connects to the basic receiver in FIGS. 6, 7, 8.

FIG. 6 shows a view of the base device that the fitting of FIGS. 1-3 threads into and creates a secure mounting structure for the sensing devices to be attached to, utilizing the bracket attachments shown in subsequent drawings.

FIG. 7 shows a second view of the base device that the fitting of FIGS. 1-3 threads into and creates a secure mounting structure for the sensing devices to be attached to utilizing the bracket attachments shown in subsequent drawings.

FIG. 8 shows a third view of the base device that the fitting of FIGS. 1-3 threads into and creates a secure mounting structure for the sensing devices to be attached to utilizing the bracket attachments shown in subsequent drawings.

FIG. 9 shows additional features that complement the entire apparatus that comprises the invention, specifically a bracket attachment that connects to the base device of FIGS. 6, 7, 8, and accommodates the attachment of 18 mm cylindrical sensors that may require angular adjustment to achieve sensitive locational settings. In embodiments, the invention comprises a spherical/gimbal mount to effect this requirement.

FIG. 10 shows further additional features of the bracket of FIG. 9.

FIG. 11 shows yet further additional features of the bracket of FIG. 9.

DETAILED DESCRIPTION

Figure 1:
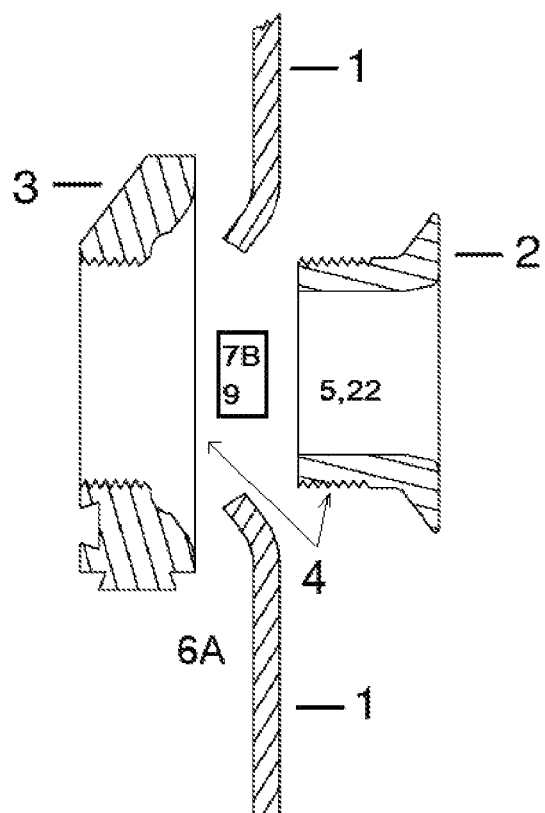
FIG. 1 shows a cross-section of the main embodiment of the invention, exploded.
Figure 2:
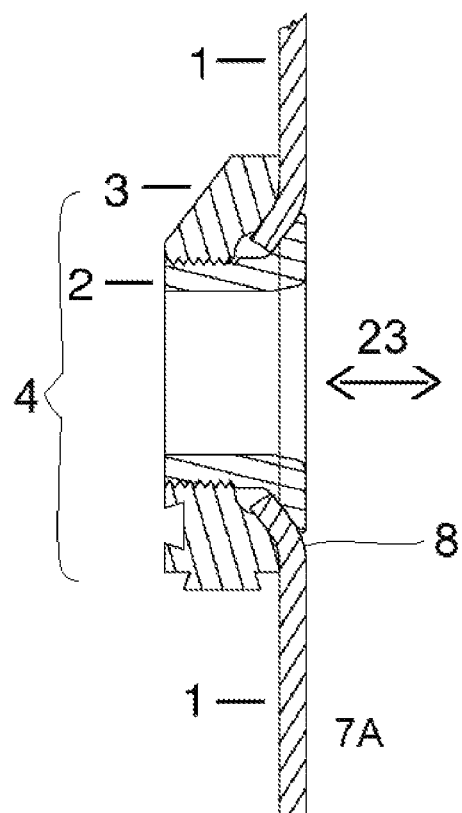
FIG. 2 shows a cross-section of the main embodiment of the invention, assembled.

Referring to FIGS. 1 & 2, a key feature of major embodiments of the apparatus is the tapered surfaces of the primary element 2 and receiving element 3, as further described below in connection with FIG. 4. Side guard 1 is also shown, having a deformation corresponding to these tapered surfaces. A fundamental distinguishing aspect of the invention is the creation of the taper/conic/frusto-conic surface by deformation of the mounting substrate. This also creates two mounting surfaces 8: the one that primary element 2 (internal one) interfaces with and the one that receiving element 3 (external part) interfaces with. Also, surfaces 8 are created by deformation, not metal-cutting/removal. FIG. 2 shows the assembled configuration 4 of elements 2 and 3 on either side of the side guard 1.

Referring to FIG. 3, in an embodiment, the primary element 2 contains a quantity of sub-surface indentations 15 to allow a mating tightening tool to interface with the device and be tightened into mating surfaces in the primary element, as further described below in connection with FIG. 6. Also shown is front surface 11 of primary element, recessed below side guard 1. Interior bore 13, may preferably also be threaded for direct attachment of threaded sensors Referring to FIGS. 4 & 6, a key concept of the design is the tapered surface 12 of primary element 2 and the mating tapered surface 17 of receiving element 3.

The receiving portion 3 of the apparatus contains a correspondingly mating surface 17 which abuts the distal surface of the side guard and attaches to the primary element 2 by means of a threaded surface 14 mating to internal threads of receiving element 16. These mating threads may be left- or right-handed threads, or other means of interlocking.

FIG. 5 shows the front surface 11 of primary element that is recessed below surface of side guard.

Referring to FIG. 6, in a fundamental embodiment, the tapered surface 12 of primary element 2, and the mating tapered surface 17 of receiving element 3 each possess a thru-hole 10 through which the emitter 22 sensing beams pass. The 'tapered' or 'sloping' geometry possessed by these features may alternatively be described as frusto-conical, 'frustum slice' or the like. A typical application is a conveyor 1 lane of any width, (having sheet metal side guards 1 to contain the package within the conveyor lane 6B) with photo-electric beams 23 crossing at various locations 5 to detect package presence/passing, The thru-holes 10 allow the sensing beam devices 5 to be mounted external to the side guard 1 with no mechanical interference from the package.

The mounting hole through the sheet metal side guard is formed by a compound punch/die that creates the correct size mounting hole and creates the taper in a single operation. The tapered, recessed surface 12 is the key concept that allows the primary element of the apparatus 2 to reside below the surface of the side guard, preventing contact with passing packages. It is improved upon to create the sub-surface mounting plane 21 (the taper) that retains the device.

Referring again to FIG. 6, in an embodiment, indentations 15 of primary element 2 allow a mating tool to interface with the device and be tightened into mating surfaces 16 in element 3. These mating threads may be left-handed to prevent counter-rotation when other threaded sensing devices are attached.

Referring to FIGS. 7 through 11, in an embodiment, notch 18 fits into a section of an attachment to prevent movement. The secondary receiving element 3 contains dove-tailed (or similar shaped) surfaces 19 and 20, in embodiments, that allow the attachment of multiple styles of brackets 25 of various designs for different sensors or different devices providing various functions such as a gimbal mount 24. allow for securely attaching other brackets. Mounting surface 21, in an embodiment, abuts the side guard/sheet metal structure.

The base configuration allows for a multiplicity of designs to accommodate a multiplicity of devices to be mounted. A preferred embodiment uses an 18 mm cylindrical barrel (industry standard) however other sizes of cylindrical sensors or other mounting configurations can be easily utilized and provided.

There are, in embodiments, applications for the two devices to be mated or retained by a simple spring-loaded locking annulus/tab that allows a push-together locking function if rotational clamping/orientation is not required. It may be preferable for the primary element 2 to be non-cylindrical (triangular, square, pentagonal, hexagonal, etc.) for whatever reason, such as requiring specific rotational orientation.

Figure 12:
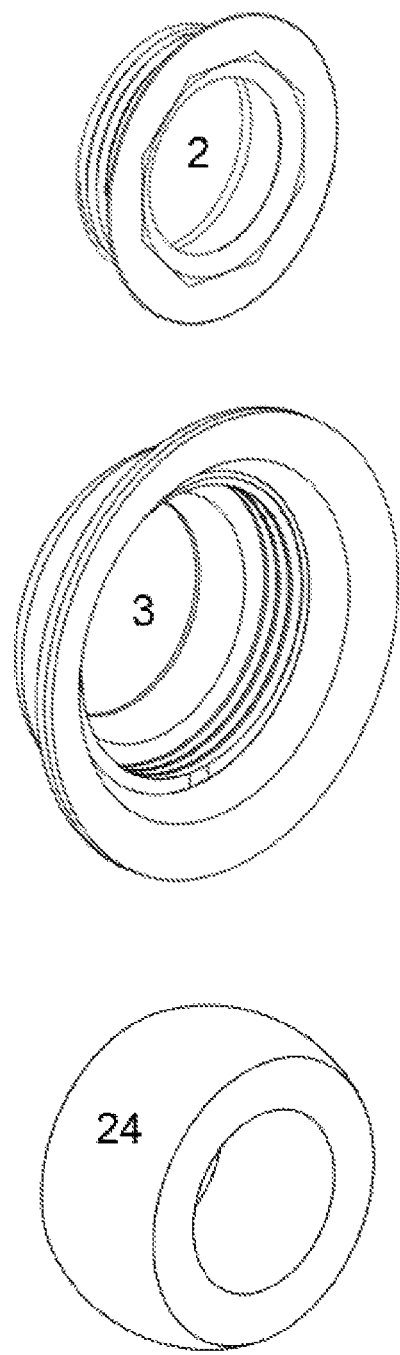
FIG. 12 shows, in an embodiment, a tapered fitting through a hole in a sidepan, accommodating "knuckle" or "pivot ball" that holding a photo-eye/device.

Referring to FIG. 12, tapered fitting 2 seats inside the tapered surface 3 and through the hole in the sidepan. There is a radiused surface inside that accommodates "nut" 24, which tapered fitting 2 fits into and provides the clamping/holding force, also with a radiused surface. Nut 24 is a "knuckle" or "pivot ball" that holds the photo-eye emitter 22 device in its angular adjustment, and is about 16 mm in diameter, and is clamped in position between elements 2 & 3.

Material selection, in embodiments, is varied: injection molded plastic is likely due to complexity/simplicity of design. In embodiments, some elements are machined aluminum or other metal for corrosion resistance, accuracy of fit, reduced die costs or other factors.

The creation of the correct hole diameter and conical mounting surface is preferably accomplished by way of a compound punch and flaring tool, in a single operation, after creating the initial hole allowing for insertion of the pull-rod for the punch. The conical surface created thereby provides a dual-planed interface: one being on the interior surface of the created conic and one being on the exterior surface of said substrate. primary element interfaces and mounts into the interior surface, and receiving element mounts and secures against the exterior surface.

Although as illustrated and described, a photo-sensor 5 is used to generate the detection signal, alternative sensing devices such as proximity switches, motion detectors, weighing devices such as scales, bar code scanners, color detectors, laser sensing devices, magnetic readers or sensing devices and other sensing devices that detect the presence of an item or a property of an item, (such as motion or weight) and which may be used to generate a detection signal may be utilized in connection with the invention. Furthermore, although a standard size of 18 mm is described in connection with many embodiments, it is to be understood that this indication is intended as a non-limiting guideline, not to depart from the non-restrictive spirit of the invention as a whole.

I claim:

1. A fitting for mounting a detection device on at least one side guard of a conveyer apparatus, and for detecting conveyance activity between said at least one side guard and a second, substantially parallel, side guard, comprising:
   a mounting surface connected with a said detection device;
   a primary element and a receiving element having matching beveled surfaces, said surfaces mating with respect to a first hole made in said at least one side barrier surface;
   a surface region, surrounding said first hole, securely fixed by said mating wherein said surface region surrounding said first hole comprises a receiving surface having a slope, said slope substantially equal to a slope of said beveled surfaces and wherein,
   said second surface is a second side guard of the conveyer;
   said primary and receiving elements comprise matching threads;
   said side guards are substantially vertical;
   said first hole is disposed along a line substantially perpendicular to said path; and
   the fitting further comprising,
   a second hole in said second surface mounting an emitter along said line.

2. The fitting of claim 1 wherein an acoustic and/or electromagnetic beam emitted by said emitter is detected by said detection device, after traversing said path and making contact with at least a portion of said articles.

3. A fitting for mounting a detection device on at least one side guard of a conveyer apparatus, and for detecting conveyance activity between said at least one side guard and a second, substantially parallel, guard, comprising:
   a threaded primary element and a threaded receiving element having matching beveled surfaces, said surfaces mating with respect to a first hole made in said at least one side guards;
   a surface region, surrounding said first hole, securely fixed by said mating;
   wherein said surface region surrounding said first hole comprises a receiving surface having a slope, said slope substantially equal to a slope of said beveled surfaces and the fitting further comprising:
   a second hole in said second side guard mounting an emitter along said line.

4. The fitting of claim 3 wherein said primary element further comprises an indentation fitted to engage a tightening tool.

5. The fitting of claim 3 wherein said mounting surface comprises a notch for fixing an attachment.

6. The fitting of claim of 3 wherein said receiving element comprises a dove-tailed shape enabling secure attachment of a bracket.

7. The fitting of claim 6 wherein said bracket accommodates the attachment of an 18 mm angular adjusting cylindrical sensor.

8. The fitting of claim 6 wherein said bracket accommodates the attachment of a spherical/gimbal mount.

9. The fitting of claim 3 wherein said threaded primary element and threaded receiving element are composed of machined aluminum.

10. The fitting of claim 3 wherein said detection device comprises a photo-sensor.

11. The fitting of claim of claim 10 wherein said detection device is a bar code scanner, a color detector or a laser sensing devices.

12. The fitting of claim 3 wherein said detection device comprises a device selected from the list of: a proximity switch, a motion detector, a weighing device, a magnetic reader.

* * * * *